E. G. RITCHIE.
BELT FASTENER.
APPLICATION FILED FEB. 14, 1917.
1,261,166. Patented Apr. 2, 1918.
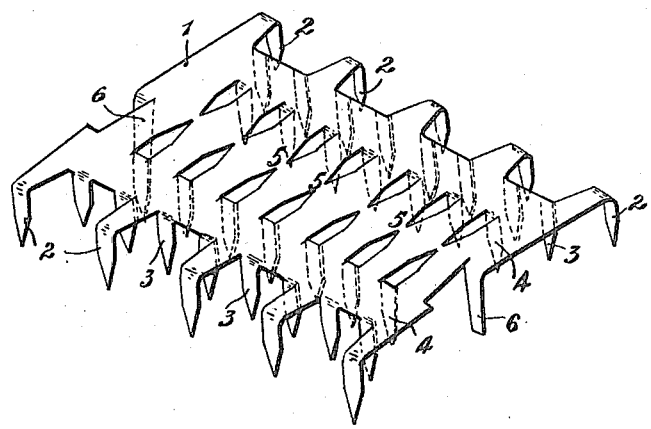
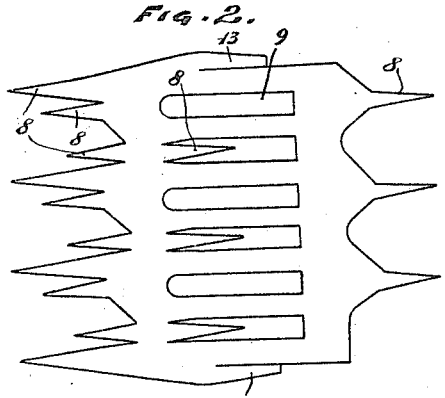
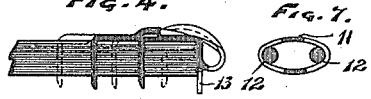
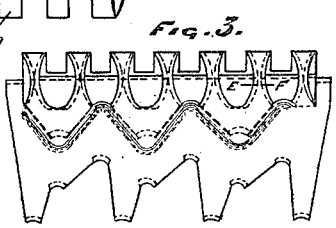
INVENTOR.
E. G. RITCHIE
BY: 
ATTORNEY.

UNITED STATES PATENT OFFICE.

ERNEST GUTHRIE RITCHIE, OF DUNDEE, SCOTLAND.

BELT-FASTENER.

1,261,166.  Specification of Letters Patent.  Patented Apr. 2, 1918.

Application filed February 14, 1917. Serial No. 148,582.

*To all whom it may concern:*

Be it known that I, ERNEST GUTHRIE RITCHIE, a subject of the King of the United Kingdom of Great Britain and Ireland, and residing at Dundee, Scotland, have invented a certain new and useful Improvement in Belt-Fasteners, of which the following is a specification.

The invention relates to belt fasteners comprising a metal strip or hingedly connected strips, formed with parallel rows of belt-engaging prongs, the prongs of the several rows being preferably staggered.

A feature of the invention resides in the provision at the lateral edges only of the fastener of depending limbs adapted to enter the gap between the ends of the belt to be fastened and to serve as gages in the attachment of the fastener to the belt.

A further feature consists in the corrugated formation of the prongs.

It will be understood that when the fastener is in position, the rows of prongs extending transversely of the belt, the longitudinal corrugations of the prongs representing strengthening arches, and offering a rounded surface to the fibers which are thus less liable to be cut.

If made in one piece, the fastener may be slightly cambered to permit it to pass readily around a pulley of small diameter; if made in two pieces, the pieces may be pivotally connected as by means of a link.

One construction of belt fastener according to the invention is illustrated in perspective in Figure 1 of the accompanying drawing.

In Fig. 2 is shown a blank from which is formed one element of a two-part jointed fastener. Fig. 3 is a plan view showing one element of the fastener when finished. Fig. 4 is a section showing the same applied to a belt. Fig. 5 is a section through the line E—F of Fig. 3. Fig. 6 is a detail view of a link used for uniting the elements of a two-part fastener. Fig. 7 is a section showing the link and associated hinge pins.

As shown, the strip 1 is provided with outer rows of prongs 2 and with intermediate rows of prongs 3 derived from the metal at the longitudinal edges of the strip and with inner rows of prongs 4 formed by slotting the strip transversely, the slots being of substantially triangular form so as to leave a connecting web 5.

The lateral marginal edges of the strip are formed with depending limbs 6 adapted for insertion into the gap between the ends of a belt, so as to serve as gages in the attachment of the fastener.

In the form shown in Figs. 2 to 7, the fastener-section is provided with rows of prongs 8, comprising outer rows, intermediate rows and inner rows, the prongs of the several rows being preferably staggered, and corrugated longitudinally as shown. As best shown in Fig. 2 the blank is formed with slots 9, which when the blank is bent or turned over as indicated in Figs. 3 and 4 present recesses for engagement by eyes 10 of the link 11, which, in conjunction with hinge pins 12, serves to connect two fastener sections.

The limbs 13 correspond in function to the limbs 6 of the construction shown in Fig. 1.

What I claim is:—

A belt fastener composed of a metal strip adapted to lie on the side of the belt and formed with staggered rows of corrugated belt-engaging prongs presenting arched surfaces transverse to the length of a belt, and with depending limbs at the lateral edges only to enter the gap between the ends of a belt.

In testimony whereof I have signed my name to this specification in the presence of two subscribing witnesses.

ERNEST GUTHRIE RITCHIE.

Witnesses:
  WALLACE CRANSTON FAIRWEATHER,
  HENRY MASON.

Copies of this patent may be obtained for five cents each, by addressing the "Commissioner of Patents, Washington, D. C."